Sept. 2, 1952 W. T. REA 2,609,453
HALF DUPLEX TELEGRAPH REPEATER, INCLUDING BREAK FEATURE
Filed Sept. 27, 1949
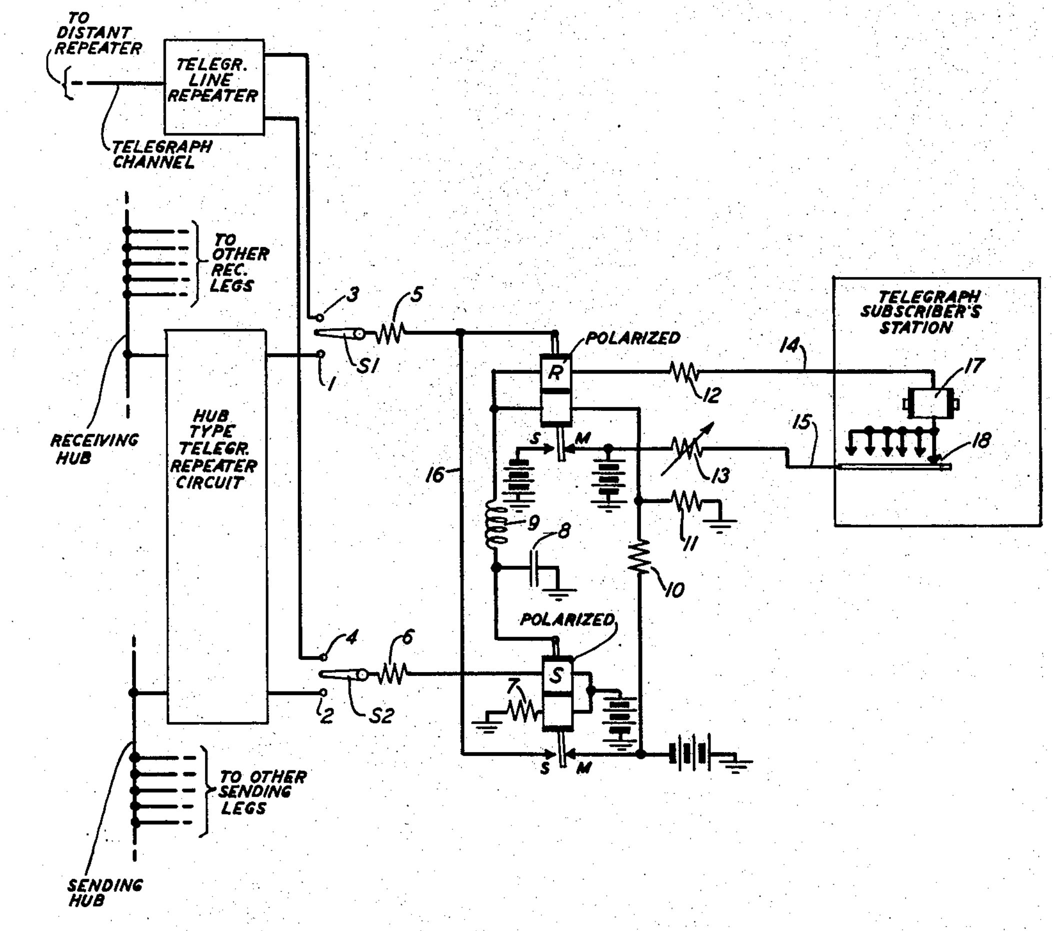
INVENTOR
W. T. REA
BY John E. Cassidy
ATTORNEY Patented Sept. 2, 1952

2,609,453

UNITED STATES PATENT OFFICE 2,609,453

HALF DUPLEX TELEGRAPH REPEATER, INCLUDING BREAK FEATURE

Wilton T. Rea, Manhasset, N. Y., assignor to Bell Telephone Laboratories, Incorporated, New York, N. Y., a corporation of New York Application September 27, 1949, Serial No. 118,118

4 Claims. (Cl. 178—70)

This invention is an improved direct-current subscriber's telegraph loop repeater circuit of the magnetic relay type, which repeater circuit has but two relays, namely, a sending relay and a receiving relay, and which repeater includes a break feature while having no break relay or equivalent individual switching element to perform the break function. The repeater of the present invention is arranged so that it may be connected through a carrier, metallic or grounded telegraph channel, or a number or combination of such facilities in tandem, which facilities are well known in the art, to a corresponding repeater, to interconnect two subscribers' telegraph loop circuits together, one at each end of the system. The present repeater may be employed also to interconnect a telegraph subscriber's station circuit and its associated loop through a hub-type telegraph control circuit into a telegraph hub concentration comprising other telegraph loops and lines. Hub-type telegraph repeaters are well known in the art, being shown for instance in Patents 2,056,277, issued to F. S. Kinkead et al., October 3, 1936; 2,069,224, issued to G. C. Cummings, February 2, 1937; and 2,337,496, issued to me December 21, 1943. In interconnecting the present repeater into a hub-type telegraph concentration, a telegraph hub repeater control circuit of the electronic type, such as that disclosed in my copending application Serial No. 67,996, filed December 29, 1948 may, if preferred, be employed.

An object of the present invention is the provision of a two-relay subscriber's telegraph loop repeater including a break feature, which repeater may be interconnected either in the conventional tandem arrangement or into a hub-type telegraph repeater concentration.

The invention may be understood from reference to the drawing which shows the repeater circuit of the present invention.

In the drawing a telegraph subscriber's station is shown at the right which is interconnected through two conductors forming the loop to the subscriber's loop repeater shown in the middle of the drawing, which loop repeater is located at a telegraph repeater station. The loop repeater may be connected according to the service required either through a hub-type telegraph repeater circuit to a hub repeater concentration or through the more conventional tandem telegraph channel arrangement. This is indicated by switches S1 and S2. In their lower positions switches S1 and S2 engage terminals 1 and 2, respectively, leading through a hub-type telegraph repeater circuit to the receiving hub and sending hub, respectively. Other telegraph subscribers' stations, and other telegraph line facilities will also be connected into the hub telegraph repeater concentration. This is indicated by the short spur connections at the top and bottom of the receiving and sending hubs.

If switches S1 and S2 engage terminals 3 and 4 the loop repeater is connected through a telegraph line repeater and a telegraph channel to a distant repeater. These repeaters and channels are conventional and may be of any of a variety of forms well known in the art.

The loop repeater is shown in the condition which it assumes when idle or during the reception of a marking signal element, with the armature of its receiving relay R and of its sending relay S each in engagement with its respective right-hand or marking contact M. The conditions which effect this will first be described.

It will be assumed that switches S1 and S2 engage terminals 1 and 2, respectively. For the marking condition the conductor extending from the sending leg of the hub telegraph repeater circuit to terminal 2 is connected in the hub telegraph repeater circuit to positive battery and, assuming switch S2 in engagement with terminal 2, the circuit continues through resistance 6 and the top or line winding of sending relay S to positive battery of the same magnitude as that in the hub repeater, so that no current flows through the top winding of sending relay S. A biasing circuit extends from positive battery through the bottom winding of relay S and resistance 7 to ground. The effect of the biasing current in the bottom winding tends to actuate the armature of sending relay S to engage its right-hand or marking contact M. When no current flows in the top winding of sending relay S, the effect of the biasing winding is unopposed and the armature of relay S is actuated to engage its marking contact M.

When the armature of relay S engages its marking contact M, a circuit may be traced from negative battery through the marking contact M and armature of relay S and through inductance 9, to the apex of receiving relay R where it branches. The main transmission path continues through the top or line winding of receiving relay R, resistance 12 and loop conductor 14, to the subscriber's station where it extends through teletypewriter receiving magnet 17, teletypewriter transmitting contacts 18 and returns to the repeater station through loop conductor 15, and variable resistance 13 to positive battery. Since the batteries connected to the ends of the loop are of opposite polarities, full line current flows through the loop and through the top winding of the receiving relay R for this condition and its effect tends to actuate its armature to engage its right-hand or marking contact M. From the apex of relay R a biasing circuit extends through its lower winding and resistance 11 to ground. The effect of the current in the biasing circuit tends to actuate the armature of relay R to engage with its left-hand or spacing contact S, but the effect of the current in the upper winding of relay R is dominant for this condition and the armature of relay R is actuated to or maintained in engagement with its right-hand or marking contact M. When line current flows through receiving magnet 17 a marking signal is received at the station.

While receiving relay R is in engagement with its marking contact M, a circuit is established from positive battery through the marking contact M and armature of receiving relay R, resistance 5, switch S1, terminal 1 and into the hub-type telegraph repeater to propagate the marking signal to the hub.

For the transmission of a spacing signal from the hub-type telegraph repeater, negative battery is connected in the hub-type repeater to the circuit extending through the top winding of the sending relay S. The effect of this current tends to actuate the armature of sending relay S to engage its left-hand or spacing contact S and this effect is dominant over the counter effect in the biasing winding so that the armature of relay S is actuated to engage its spacing contact. This establishes a circuit extending from positive battery through the right-hand or marking contact M and armature of relay R, conductor 16, left-hand or spacing contact S and the armature of sending relay S, from which point the circuit has been traced around the loop and through the biasing winding of relay R. For this condition both ends of the loop are terminated in the same positive battery so that no current flows around the loop and through the top winding of receiving relay R. When negative battery was connected to the apex of relay R for the marking condition, its effect in the biasing winding tended to actuate the armature of relay R toward its spacing contact. Now, with positive battery connected to the apex of relay R, the effect in the biasing winding is reversed and is such as to tend to maintain the armature of relay R in engagement with its right-hand or marking contact M. Since this effect is unopposed, as there is no current in the top winding of relay R, the armature relay R will be maintained on its right-hand or marking contact. When no current flows through receiving magnet 17 a spacing signal is received at the subscriber's station.

In transmitting from the subscriber's station toward the loop repeater, for a marking signal, the condition is the same as described for a marking signal transmitted toward the subscriber's station. For a spacing signal the teletypewriter transmitting contacts 18 are opened, opening the loop. No current flows in the loop or through the top winding of receiving relay R. Since the sending relay S is in engagement with its right-hand or marking contact M for this condition, negative battery is connected to the apex of receiving relay R. The effect of this in the bottom or biasing winding of relay R, as has been explained, tends to actuate the armature of relay R to engage its left-hand or spacing contact and, since for this condition it is unopposed, the armature of receiving relay R will be actuated to engage with its left-hand or spacing contact S. Negative battery is, therefore, connected through the spacing contact and armature of relay R, resistance 5, switch S1, terminal 1 and into the hub-type telegraph repeater to propagate a spacing signal to the receiving hub.

It will now be assumed that the subscriber at the telegraph subscriber's station shown at the right in the drawing is transmitting and at the moment is transmitting a marking signal element toward the loop repeater and another of the subscribers connected through the hub wishes to break and transmits a long spacing signal through the hub to sending relay S. This will actuate the armature of relay S to spacing in a manner which has been described. Since the armature of receiving relay R will be in engagement with its marking contact M, positive battery will be connected through the marking contact and armature of relay R, conductor 16, and spacing contact S of relay S to one end of the loop while the opposite end of the loop is terminated in the same positive battery. No current will therefore flow in the loop or through receiving magnet 17, and a spacing signal will be received by receiving magnet 17. The armature of relay R will be maintained in engagement with its marking contact by the effect of positive battery flowing through its bottom or biasing winding. If transmitting contacts 18 are now opened in an attempt to transmit a spacing signal it will be ineffectual, since there is no current in the top winding of relay R to be interrupted and the armature of relay R will continue to be maintained in engagement with its marking contact M.

If a spacing signal element is being transmitted from transmitting contacts 18 when a long space or break signal arrives at sending relay S, it will not be possible to break immediately. The reason for this is that when the armature of relay S is actuated to its spacing contact, since the armature of receiving relay R will be in engagement with its left-hand or spacing contact S, in response to the spacing signal from contacts 18, negative battery will be connected through the spacing contact and armature of relay R, conductor 16, spacing contact S and armature of relay S and inductance 9 to the apex of relay R. The path around the loop will be open at contacts 18 which are assumed to be open for the transmission of a spacing signal. With negative battery connected to the apex of relay R and no current in its top winding the effect of the current in the biasing winding will be such as to tend to actuate the armature of relay R to its spacing contact. The spacing signal being received by relay R will be unaffected by the reception of a break signal by relay S. In other words it is not possible to break against a break.

When contacts 18 are reclosed for the transmission of the succeeding marking signal element, the break signal, or long spacing signal, being received by relay S will be propagated to the subscriber's station.

If signals are incoming from the hub through sending relay S to receiving magnet 17 at the subscriber's station and transmitting contacts 18 are opened to transmit a long space or break signal, if a marking signal is at the moment being transmitted from relay S, the armature of relay R will be actuated to its spacing contact as for any spacing signal transmitted from the subscriber's station. The armature of relay R will be maintained on its spacing contact when the armature of relay S attempts to transmit the succeeding spacing signal element since negative battery will be supplied through the spacing contacts and armatures of relays R and S to the biasing winding of relay R. A long spacing signal will be transmitted into the hub telegraph repeater as a break signal. Succeeding marking and spacing signals incoming to relay S will have no effect on relay R, since as long as relay R remains spacing, negative battery is connected to both contacts of relay S.

If the left-hand or spacing contact of relay S were connected solidly to positive battery, rather than having its battery polarity controlled by the position of the armature of relay R, the break feature would be lacking and the following would occur: in the presence of an open condition at contacts 18, signals incoming from the line repeater to relay S would be repeated back to the line repeater by relay R, but in inverted form. This is because relay R, in the absence of current in its upper winding, is subject to the current in its lower winding. Therefore, with relay S on its right-hand or marking contact, the application of negative battery to the lower winding of relay R would actuate relay R to its left-hand or spacing contact, and when relay S moved to its left-hand or spacing contact the application of positive battery to said winding would actuate relay R to its right-hand or marking contact. Hence the distant station would receive its own signals in inverted form, rather than the clean open or break signal which the near station attempted to transmit.

If a spacing signal is incoming from the hub and the armature of relay S is in engagement with its spacing contact S when transmitting contacts 18 are opened to transmit a long space or break signal toward the hub, the armature of relay R will be maintained in engagement with its marking contact M until the end of the spacing signal element, as positive battery will be connected through the marking contact and armature of relay R and the spacing contact and armature of relay S to the apex of relay R. Current flowing through the biasing winding of relay R for this condition, while no current flows in its top winding, as the loop is open at contacts 18, will maintain the armature of relay R in engagement with its marking contact M. When the armature of relay S is next actuated to marking, the long spacing or break signal from contacts 18 will be propagated into the hub circuit.

For connection to the more conventional single telegraph channel through a telegraph line repeater the local side of the line repeater is arranged in a well-known manner with a receiving leg and a sending leg which terminate on terminals 3 and 4. Switches S1 and S2 are actuated to engage terminals 3 and 4, respectively. The conditions imposed on the loop repeater by the telegraph line repeater and vice versa for communication signals and for breaking are the same as described in the foregoing for connection with the hub repeater.

The inductance 9 and the grounded condenser 8 connected to the lower terminal of the inductance are provided to improve the wave shape of the signals and to protect the contacts of relay S from erosion.

What is claimed is:

1. A telegraph subscriber's station, a magnetic relay telegraph loop repeater, a telegraph loop interconnecting said station and said repeater, a telegraph line repeater, a sending leg and a receiving leg interconnecting said loop repeater and said line repeater, a receiving relay and a sending relay in said loop repeater, a line winding on said receiving relay connected in series in said loop, responsive to signals from said loop, a line winding on said sending relay connected in series in said sending leg responsive to signals from said line repeater, an armature and a pair of opposed contacts on each of said relays, batteries of opposed polarity directly connected to said opposed contacts on said receiving relay, battery of a first polarity connected to one of said opposed contacts on said sending relay and a direct connection from the other of said opposed contacts on said sending relay to the fixed end of said armature on said receiving relay, to afford a break feature in a two-relay repeater.

2. In a telegraph loop repeater, a sending relay, a receiving relay, an armature on each of said relays, a first circuit path extending directly from battery of a first polarity through a first contact and said armature of said sending relay, through an operating winding of said receiving relay, through a subscriber's telegraph loop circuit and back to battery of a second polarity for a first signaling condition, a second circuit path extending from battery of said second polarity directly through a first contact and said armature of said receiving relay, through a second contact and said armature of said sending relay for a second signaling condition, a sending leg extending from a second telegraph repeater through an operating winding of said sending relay, a receiving leg extending from said armature of said receiving relay into said second repeater and a biasing circuit extending from said armature of said sending relay through a biasing winding on said receiving relay.

3. In a telegraph repeater system, a subscriber's telegraph station, a magnetic relay telegraph repeater, a line, a telegraph loop connecting said subscriber's station and said repeater, a sending leg and a receiving leg interconnecting said repeater and said line, a receiving relay and a sending relay in said repeater, said sending relay including an operating winding, a biasing winding and an armature responsive to said windings to transmit communication signals through said telegraph loop to said station when signals are impressed by said line on said sending leg, said receiving relay having a line winding, a biasing means and an armature responsive thereto to transmit signals through said receiving leg to said line in response to signals incoming from said telegraph loop, a marking and a spacing contact on each of said relays, batteries of opposed polarities connected to said contacts of said receiving relay, battery of the same polarity as that connected to said spacing contact of said receiving relay connected to said marking contact of said sending relay, and breaking means in said repeater comprising a direct interconnection from the armature of said receiving relay to said spacing contact of said sending relay.

4. In a telegraph repeater system, a hub-type telegraph repeater, a magnetic relay telegraph loop repeater, a telegraph subscriber's station, a first and a second relay in said loop repeater, an operating winding, a biasing winding and an armature on each of said relays, said operating and biasing windings on each relay each having one end connected to an individual terminal for its respective relay, a first and a second conductor connecting said hub repeater and said loop repeater, a third and a fourth conductor connecting said loop repeater and said station, said first conductor in a path extending from said hub repeater through said operating winding on said first relay to its individual terminal, said second conductor in a path extending from said hub repeater through said armature and a first contact on said second relay to battery of a first polarity, a circuit path extending from battery of said first polarity at said loop repeater through said third conductor, said station, said fourth conductor, said operating winding and terminal on said second relay and said armature and a first contact on said first relay to battery of a second polarity for a first signaling condition, a fifth conductor extending from said armature on said second relay to a second contact on said first relay, and a path extending from said battery of said first polarity through said first contact and aramature on said second relay, said fifth conductor and said second contact and armature on said first relay, when the armature of said first relay is actuated in response to a signal incoming over said first conductor from said hub repeater to said loop repeater.

WILTON T. REA.

REFERENCES CITED

The following references are of record in the file of this patent:

UNITED STATES PATENTS

| Number | Name | Date |
|---|---|---|
| 1,978,020 | Hunkins | Oct. 23, 1934 |